UNITED STATES PATENT OFFICE.

CONRAD HENRY MATTHIESSEN AND JOSEPH KRIEGER, OF CHICAGO, ILLINOIS.

PROCESS OF REFINING DEXTRINE.

SPECIFICATION forming part of Letters Patent No. 382,368, dated May 8, 1888.

Application filed November 1, 1887. Serial No. 253,965. (No specimens.)

*To all whom it may concern:*

Be it known that we, CONRAD HENRY MATTHIESSEN and JOSEPH KRIEGER, of Chicago, Illinois, have invented a certain Improvement in the Art of Manufacturing Refined Dextrine, of which the following is a specification.

The process of manufacturing the dextrine of commerce is well known and does not herein need special reference. Commercial dextrine, however, is rendered undesirable for certain uses, owing to the presence in it of cellulose, starch, gluten, fats, sugar, acids, and certain coloring-matters, the exact nature of which is unknown.

The present invention relates to a process of refining commercial dextrine, which consists, first, in fermenting a watery solution of commercial dextrine until the sugar originally present has been destroyed, and in then filtering the solution through cloth or paper, and, when desired, through bone-black, and finally concentrating it to the desired density.

As an example of the process, twenty pounds of commercial dextrine are dissolved in ten gallons of water and then allowed to stand until it has undergone fermentation, which, unless hastened, may require a period of one or two weeks, or more, according to circumstances. To hasten fermentation, however, about half a pound of any suitable ferment—such as yeast—may be added to the solution. In either case, whenever fermentation is completed, the solution is neutralized by the addition to it of sodium carbonate or some other agent having similar properties, after which the solution is filtered through paper or cloth to remove any mechanical impurities which may be present; and if it be desired to decolorize it, it is then run through bone-black, after which the solution is concentrated by evaporation to the desired density.

The distinguishing characteristic of this process is the elimination of the sugar from commercial dextrine by fermentation preparatory to the filtration of the solution.

The product resulting from this method of refining is refined dextrine, free from cellulose, starch, fats, gluten, and sugar, and, when run over bone-black, also free from coloring-matters.

It is intended to make the said product the subject of a separate application for patent as a new article of manufacture.

What is claimed as the invention is—

The process of refining commercial dextrine herein described, which consists in first causing a watery solution of commercial dextrine to ferment until the sugar originally present has been destroyed, and in then neutralizing the solution and filtering and concentrating it in the ordinary manner.

CONRAD HENRY MATTHIESSEN.
JOSEPH KRIEGER.

Witnesses:
C. J. ROE,
GEORGE W. LAMB.